March 14, 1967
O. K. NILSSEN
3,309,568
MEANS INCLUDING A SATURABLE CAPACITOR FOR REDUCING
ELECTRICAL ENERGY DISSIPATION IN AN
ELECTRICAL SWITCHING ELEMENT
Filed Jan. 2, 1964
3 Sheets-Sheet 1
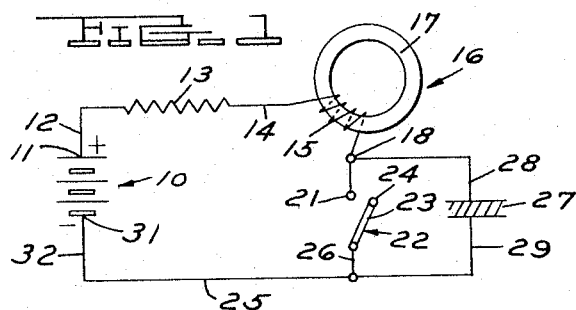
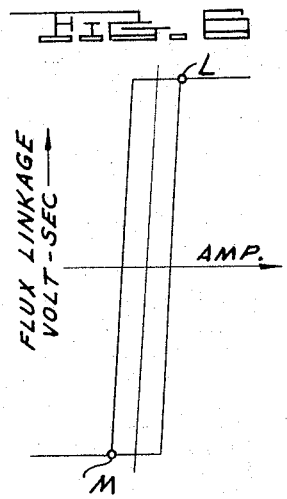
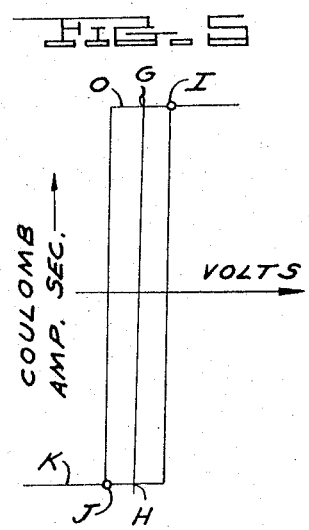
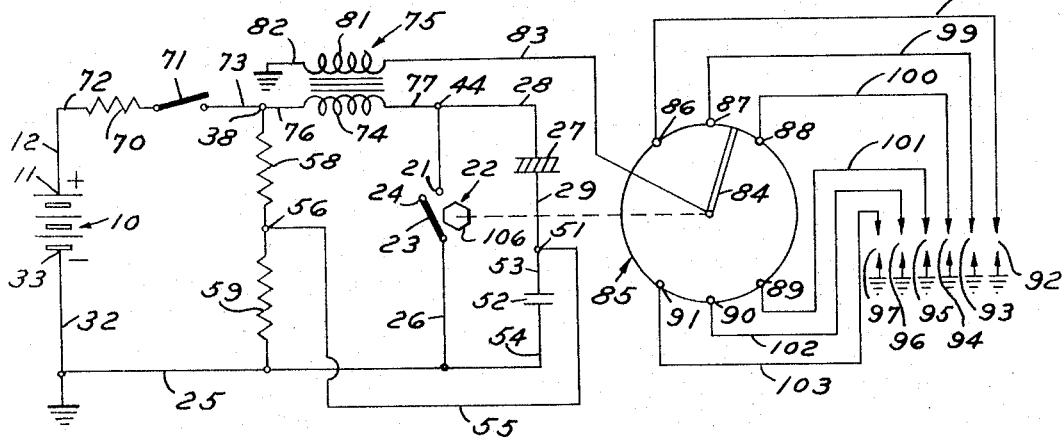
OLE K. NILSSEN
INVENTOR.
BY John R. Faulkner
Keith L. Zerschling
ATTORNEYS

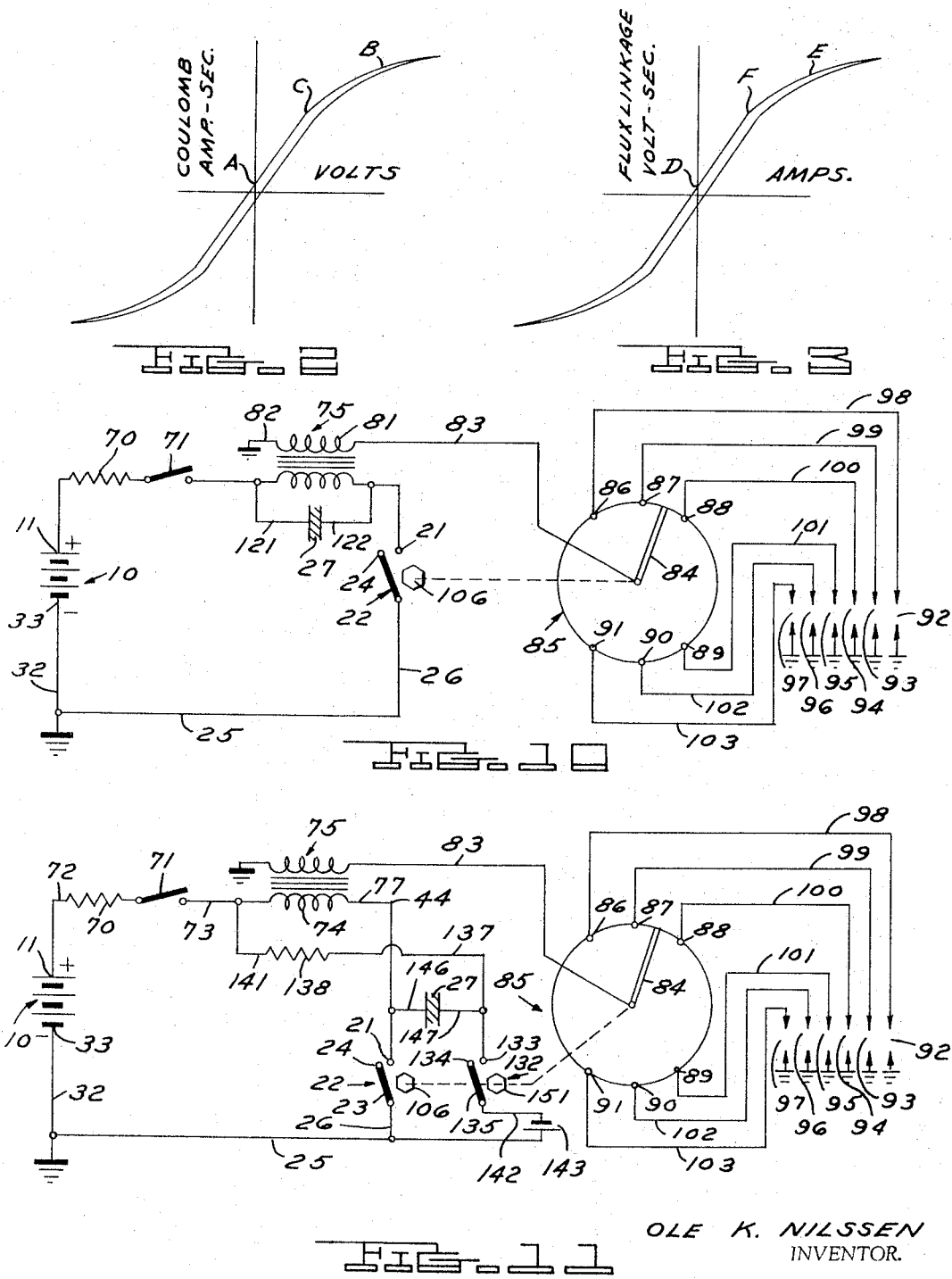

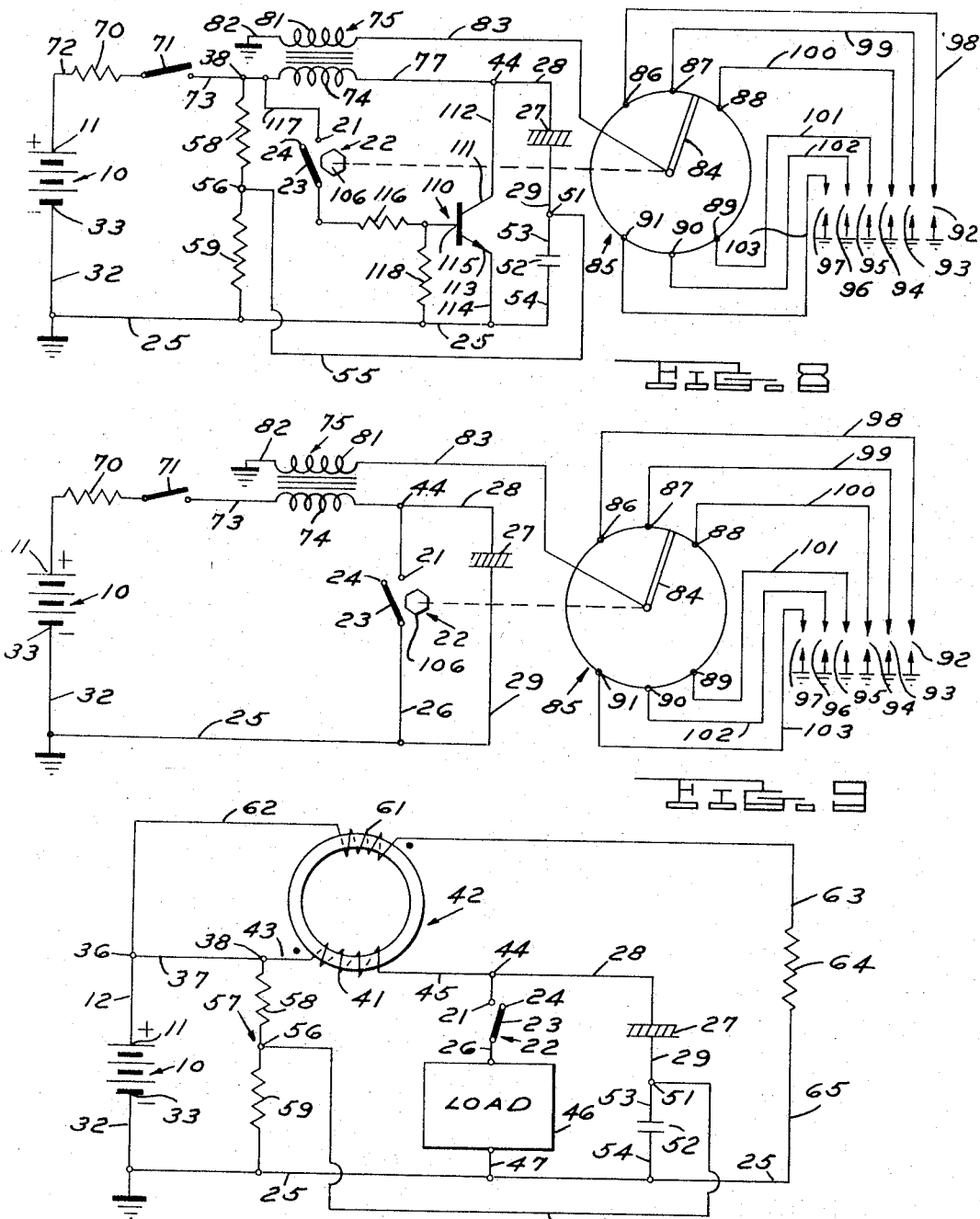

3,309,568
MEANS INCLUDING A SATURABLE CAPACITOR FOR REDUCING ELECTRICAL ENERGY DISSIPATION IN AN ELECTRICAL SWITCHING ELEMENT
Ole K. Nilssen, Livonia, Mich., assignor to Ford Motor Company, Dearborn, Mich., a corporation of Delaware
Filed Jan. 2, 1964, Ser. No. 335,044
12 Claims. (Cl. 315—223)

This invention relates to a means for reducing electrical energy dissipation in an electrical switching element and more particularly to a means for reducing arcing in the contact electrodes of a conventional ignition system for an internal combustion engine and for reducing the energy dissipated in a transistor when a transistor is used in an internal combustion engine ignition system.

In the switching of electrical switching elements both from the conducting to the nonconducting state and from the nonconducting to the conducting state, a large amount of electrical energy may be dissipated in the switching element during the switching period. As a result, the switching element may become permanently damaged or may require periodic replacement due to gradual deterioration.

If the switching element is a mechanical switch in which contact electrodes are employed, arcing may occur both upon opening and closing of the contact electrodes. During the closing phase of the switching operation, the contact electrode spacing reaches a point where it is so small that the voltage across the spaced contact electrodes if of sufficient magnitude to cause electrical breakdown of the air in the gap. After this breakdown occurs, current will flow in the gap and the magnitude of this current may be so high as to cause sputtering or transfer of material from one contact electrode to the other. Also, the heat, due to the energy of the arc, will promote oxidation and deterioration of the contact electrodes. This arc will last only until the contact electrodes are firmly closed, but in the meantime a permanent deterioration of the electrodes may have taken place.

Upon opening of the contact electrodes a worse situation prevails. At this time an arc will form at the slightest contact electrode separation and will remain until the spacing between the contact electrodes is so large that the voltage required to sustain it is greater than the voltage across the contact electrodes. It can be readily appreciated that this situation is worse than when the contact electrodes close because the voltage to sustain an arc in a given gap is much less than that required to initially cause the arcing to occur. Thus for equal opening and closing rates of the contact electrodes, the arc will remain much longer upon opening of the contact electrodes. The associated energy dissipation and electrode material transfer will therefore be much larger.

If the switching element is constructed of a solid state material, for example, a transistor, the situation is somewhat different. A transistor may be considered to be a variable resistor varying from infinite resistance when the transistor is in its nonconducting state to a zero resistance when the transistor is in its conducting state. This switching from the infinite resistance to the zero resistance occurs in a finite time. During the switching period, the instantaneous rate of dissipation within the transistor may reach destructively high levels, with maximum energy dissipation being equal to the square of the voltage across the transistor divided by four times the resistance of the transistor at that time. Also, if the switching speed is not high the accumulative dissipation for repetitive switching may become undesirably high. In the transistor, the situation is much the same upon both switching the transistor from its conducting to its nonconducting state and from its nonconducting state to its conducting state.

Prior art efforts to reduce the deteriorating effects described above include the installation of a capacitor across the switching element. This has been the conventional practice in ignition systems for internal combustion engines in which a capacitor is connected across the contact electrodes of the ignition contact breaker points. The installation of this capacitor improves the situation upon the opening of the contact electrodes, since it delays the voltage rise across the contact electrodes. It makes the situation worse, however, when the contact electrodes close since the capacitor at that time will be charged and will discharge through the contact electrodes of the ignition contact breaker points.

The present invention provides a means in which the energy dissipated in the switching element, both upon closing and opening of the element, will be greatly reduced thereby reducing the deteriorating effects previously discussed and increasing the useful life of the switching element. To accomplish this, a saturable capacitor is connected in circuit with the switching element and as the switching element opens or is switched to its nonconducting state, the voltage across the switching element is prevented from rising significantly until the saturable capacitor is saturated. The parameters of the system should be selected so that the switching element is switched sufficiently towards its nonconducting state so that significant energy will not be dissipated in the switching element. In the case of contact electrodes, these parameters should be selected so that the contact electrodes have had sufficient time to separate to the extent that the voltage across the contact electrodes is insufficient with that spacing to cause arcing. In a solid state switch, the voltage rise across the solid state switch or transistor should be delayed for a period sufficient to cause the resistance of the transistor as it is switched toward its nonconducting state to rise to the point where destructive energy dissipation is not permitted in the transistor. As pointed out previously, the energy dissipated in a solid state switch or transistor during switching operations is measured by the square of the voltage across the transistor divided by four times the resistance. It can be seen, therefore, that if the resistance of the transistor is high as the voltage rises across it, the energy dissipation will be small.

To improve the life of the switching element and to prevent the deteriorating effects of energy dissipation in the switching element when it is closing, a saturable inductor is connected in circuit with the switch, preferably in series with it. This saturable inductor will limit the current flowing through the switch for a short period of time until the saturable inductor saturates. This should be long enough to provide sufficient time for the electrical contacts to completely close in a mechanical switch or to allow a transistor to be very near or completely into its conducting state. Thus the effect of the saturable inductor is to greatly limit the power dissipated in the switch upon closing.

In an ignition system for an internal combustion engine, the use of the saturable capacitor connected in circuit with the switching element, either contact electrodes of an ignition contact breaker point set or a transistor of a transistorized system, prolongs the life of the switching element and eliminates the need for periodic replacement of the switching element, particularly the contact electrodes of the ignition contact breaker point set. In an ignition system, the use of a saturable inductor is not necessary since as the contacts close the current is limited initially by the inductance of the ignition coil.

In selecting the material for use in the saturable inductor and the saturable capacitor, either a square loop material or a non-square loop material may be employed. With the square loop material in which the saturation charge to remnant charge in the saturable capacitor is small and the saturation flux to the remnant flux in the saturable inductor is small, means should be provided to bias the saturable inductor or saturable capacitor with a voltage or current substantially equal to the coercive voltage or current of the saturable capacitor and inductor respectively. This is essence biases the saturable inductor or saturable capacitor just into one of its stable states close to saturation. As switching operations occur, the saturable inductor or capacitor is switched to the other saturated state and the time delay furnished by this switching action provides the means for preventing energy dissipation in the switching element as it is switching.

The square loop material should be selected so that the coercive voltage is small, say on the order of 2 or 3 volts in the saturable capacitor, so that the voltage rise across the switching element is limited to twice this coercive voltage before the saturable capacitor saturates and this low voltage will not cause substantial harm to the switching element during switching operations. The same rationale applies to the selection of the material for the saturable inductor where a square loop material is employed. The coercive current should be sufficiently small so that the coercive current does not cause deteriorating power dissipation in the switching element.

With the non-square loop material in which the saturable capacitor has a low remnant charge and the saturable inductor has a low remnant flux when compared to the saturated charge and flux, the biasing mechanism described above is not essential since a time delay will be provided in the switching operation as the inductor saturates from its low remnant flux and the capacitor saturates from its low remnant charge. The non-square loop material should be selected to have a breakover point or knee on the hysteresis curve in which the slope of the hysteresis curve decreases sharply and the material goes into saturation. The voltage or current at which this occurs should be small enough to prevent deteriorating energy dissipation in the switching element during switching operations.

If in some applications where square loop material is used, twice the coercive voltage of the saturable capacitor is too high to prevent destructive energy dissipation in the switching element as the switching element is opened, means may be provided in accordance with the invention so that less than twice the coercive voltage is required to reach the coercive level. In this case the saturable capacitor may be biased at the appropriate time to a voltage just below the coercive threshold and thus the voltage across the switching element is limited initially to a very small much less than twice the coercive voltage of the saturable capacitor.

An object of the present invention is the provision of a means for reducing electrical energy dissipation in an electrical switching element.

A further object of the invention is the provision of means for reducing the electrical energy dissipation in the switching element of an ignition system for an internal combustion engine.

A further object of the invention is to delay the voltage rise that ordinarily accompanies opening of an electrical switching element for a period of time sufficient for the switching element to be switched far enough toward its non-conducting state to prevent large energy dissipation in the switching element when the voltage does eventually rise to high levels.

Another object of the invention is the provision of a means for delaying the rise in current through an electrical switching element, as the switching element closes, for a period of time sufficient to permit the switching element to be substantially in its fully closed or conducting condition.

Another object of the invention is the provision of means in the ignition system of an internal combustion engine to substantially eliminate arcing when the contact electrodes of the ignition contact breaker points open.

Other objects and attendant advantages of the present invention will become more fully apparent as the specification is considered in connection with the attached drawings in which:

FIGURE 1 is a circuit diagram of an elementary switching circuit of the present invention;

FIGURE 2 is a hysteresis loop of a saturable capacitor that may be used with the elementary switching circuit shown in FIGURE 1;

FIGURE 3 is a hysteresis loop of a saturable inductor that may be used with the elementary switching circuit shown in FIGURE 1;

FIGURE 4 is a circuit diagram of another switching circuit of the present invention;

FIGURE 5 is a hysteresis loop of a saturable capacitor that may be employed with the switching circuit shown in FIGURE 4;

FIGURE 6 is a hysteresis loop of a saturable inductor that may be employed with the switching circuit shown in FIGURE 4;

FIGURE 7 is a circuit diagram of an ignition system for an internal combustion engine that employs the principles of the switching circuit shown in FIGURE 4;

FIGURE 8 is a transistorized ignition system for an internal combustion engine that employs the principles of the switching circuit shown in FIGURE 4;

FIGURE 9 is a circuit diagram of a conventional ignition system that employs the principles of the switching circuit shown in FIGURE 1;

FIGURE 10 is a circuit diagram of a conventional ignition system for an internal combustion engine similar to that shown in FIGURE 9, with the saturable capacitor placed in a different position in the circuit, and FIGURE 11 is a circuit diagram of another ignition system for an internal combustion engine employing the principles of the invention.

Referring now to the drawings in which like reference numerals designate like parts throughout the several views thereof, there is shown in FIGURE 1 an elementary switching circuit employing the principles of the present invention in which a source of electrical energy 10, for example, a storage battery, has one electrode 11 connected through a lead 12 to one terminal of a resistor 13. The other terminal of the resistor 13 is connected through a lead 14 to a winding 15 of a saturable inductor 16 that includes a closed magnetic core 17. The winding 15 of the saturable inductor 16 has its other terminal connected to a junction 18.

The junction 18 is connected to one contact or electrode 21 of an electrical switching element 22 that has a movable arm 23 carrying the other contact or electrode 24. The movable arm 23 is constructed of an electrically conductive material and is connected to a line or lead 25 by means of a lead 26. A saturable capacitor 27 has one terminal connected to the junction 18 through a lead 28 and the other terminal connected to lead 25 through a lead 29. The lead or wire 25 is connected to the other terminal 31 of the source of electrical energy 10 by means of a lead 32.

The hysteresis loop of the saturable capacitor 27 shown in FIGURE 1 is disclosed in FIGURE 2. It is readily apparent from an inspection of FIGURE 2 that the remnant charge of the capacitor, as designated in a positive direction at the point A, is negligible or very small when compared with the saturation charge of the capacitor as represented by the line B. The knee of this hysteresis loop, as shown at C, is located a short distance out along the abscissa of the set of axes shown and may be located at a range of 6 to 8 volts along the abscissa so that the capacitor commences to go into saturation along the line B when the potential difference of 6 to 8 volts is applied across the saturable capacitor 27.

The hysteresis loop of the saturable inductor 16 is shown in FIGURE 3 and it can be seen that the remnant flux linkage or volt-sec. as represented by the point D is quite small or negligible in relation to the saturation flux linkage or volt-sec. represented by the line E. The knee of the hysteresis loop represented by the letter F is located a short distance along the abscissa from the origin. The current through the winding 15 of the saturable reactor 16 prior to the time the knee F of the curve is reached is quite small compared with the final current through the winding when the saturable inductor 16 is saturated.

In both of the hysteresis loops shown in FIGURES 2 and 3, it should be understood that the length of the lines B and E have been substantially shortened for purposes of convenience in illustration. The voltage that eventually may be reached across the saturable capacitor 27 and the current that may flow through the winding 15 of saturable inductor 16 when these elements become saturated may be many times the voltage or amperage when the knees of the curves are reached as represented by the letters C and F respectively.

If it is assumed that the circuit shown in FIGURE 1 has not been previously energized, the closing of the contacts or electrodes 21 and 24 by movement of the arm 23 will complete a circuit from the terminal 11 to terminal 31 of the source of electrical energy 10 through resistor 13, lead 14, winding 15 of saturable inductor 16, junction 18, contacts or electrodes 21 and 24, movable arm 23, lead 26, lead 25, and lead 32. The saturable inductor 16 limits the initial current flowing through the electrodes 21 and 24 as these electrodes come into contact with one another, to a value represented by the knee F of the hysteresis loop shown in FIGURE 3 until the electrodes 21 and 24 are in engagement. Thus the current flow through the contacts or electrodes 21 and 24 is limited to a small value until the contacts are completely closed and this will prevent the dissipation of energy in the closing contacts by limiting the current flow through them. This arrangement will thus reduce and substantially eliminate any arcing that may occur as the electrodes 21 and 24 come into engagement.

After the electrodes 21 and 24 come into engagement, the saturable inductor 16 will saturate and thus permit a large current flow through the electrodes 21 and 24 and through the circuit previously described. This current will eventually be limited essentially by the value of the voltage of the electrical source 10 and resistance of the resistor 13 and the resistance of the winding 15.

When the contacts 21 and 24 commence to open, the collapsing magnetic field of the saturable inductor 16 will generate a voltage in the winding 15 that will attempt to maintain the current constant momentarily despite the fact that the resistance of the circuit previously described has been increased enormously as the contacts or electrodes 21 and 24 commence to separate. It can be appreciated that the saturable capacitor 27, connected across or in parallel with the switching element 22 delays the voltage rise across the switching element 22 as the contacts 21 and 24 commence to open by providing an alternate current path for the current flowing in the circuit previously described including the winding 15 of the saturable conductor 16.

When the contacts 21 and 24 commence to open, the saturable capacitor 27 will have a remnant charge as indicated by the letter A on the hysteresis loop shown in FIGURE 2. The saturable capacitor 27 should be selected so that knee C on the hysteresis loop of FIGURE 2 is located only a very few volts out along the abscissa of the curve. For example, depending upon the application, the capacitor 27 may be selected so that the knee C is located in the range of 2 to 8 volts. The time that it takes the capacitor to charge to this voltage will be appreciable since the curve has a steep slope between the points A and C. The contacts 21 and 24 should be fully opened or at least open far enough to prevent any arcing from occurring by the time the saturable capacitor 17 reaches the knee C of the hysteresis loop shown in FIGURE 2. After this, the voltage is free to rise along the line B, and the contacts 21 and 24 at this time will be sufficiently far open so that arcing will not occur despite the large voltage rise that occurs across the contacts 21 and 24 as the voltage rises along the line B.

When the contacts 21 and 24 have been fully opened, after all transients have disappeared and steady state conditions have been reached, the capacitor 27 will be charged so that it is positioned somewhere along the line B. Since no current is then flowing in the winding 15, the saturable inductor 16 will return to the point D on the hysteresis loop shown in FIGURE 3. When the points again close, the saturable inductor 16 will again perform in the manner previously described and the saturable capacitor will then discharge through the closed contacts 21 and 24 and when discharged will return to the point A shown on the hysteresis loop of FIGURE 2.

Thus the circuit shown in FIGURE 1 delays the voltage rise across the contacts or electrodes 21 and 24 until the contacts or electrodes 21 and 24 are opened sufficiently to prevent any arcing from occurring and delays current rise through the contacts 21 and 24 until the contacts or electrodes 21 and 24 are completely closed.

The delay in seconds of the voltage rise across the saturable capacitor 27, or the delay in reaching the point C, the knee of the hysteresis loop shown in FIGURE 2, after the contacts 21 and 24 commence to open is determined, of course, by the magnitude of the charge on the saturable capacitor 27 at the point C and by the current in the circuit at the time the contacts 21 and 24 commence to open. Similarly, the time delay in the rise in current as the contacts 21 and 24 commence to close, or the time necessary for the saturable inductor to reach the point F, the knee of the hysteresis loop shown in FIGURE 3 is determined by the value of the flux linkage of the saturable inductor 16 at the point F and the voltage drop across the winding 15. Typical values of these time delays will be given when the invention is described in relation to the switching circuits shown in FIGURES 4 and 7 through 11.

Referring now to FIGURE 4, there is shown another switching circuit that employs a saturable inductor 16 and a saturable capacitor 27 constructed of materials having substantially square hysteresis loops. In these materials, the ratio of the saturation charge to remnant charge of the saturable capacitor is small, and the ratio of the saturation flux or flux linkage to the remnant flux or flux linkage of the saturable inductor is small. The square loop material, of course, implies that these two elements, the saturable inductor 16 and the saturable capacitor 27, have two stable states in which the charge on the saturable capacitor 27 or the flux linkage of the saturable inductor 16 are determined by the remnant charge or remnant flux linkage respectively. In FIGURE 4, the source of electrical energy 10 has terminal 11 connected through the lead 12 to a junction 36. The junction 36 is connected through a lead 37 to another junction 38 and the junction 38 is connected to a first winding 41 of a saturable inductor 42 that includes a toroidal switching core 40 by means of a lead 43. Another terminal of the first winding 41 is connected to a junction 44 by means of a lead 45. It can readily be appreciated that the junction 44 corresponds to the junction 18 of the switching circuit shown in FIGURE 1, and this junction is connected to the switching element 22 by the means previously described. The switching element 22 includes the contacts or electrodes 21 and 24 and the movable arm 23. In this case the lead 26, connected to movable arm 23, is connected to a load 46 that may be any suitable electrical load, for example, an electrical motor. The load 46 is connected to the lead 25 through a lead 47.

In this embodiment of the invention, the saturable capacitor 27 has one terminal connected to the junction 44 through the lead 28 and its other terminal connected to a junction 51 through the lead 29. The junction 51 is connected to one terminal of a linear capacitor 52 through a lead 53, while the other terminal of the linear capacitor 53 is connected to the lead 25 through a lead 54. The junction 51 is also connected through a lead 55 to a junction 56 of a voltage divider 57 comprising resistors 58 and 59 that are connected in series between the junction 38 and the lead 25.

The junction 36 is also connected to a second winding 61 of the saturable inductor 42 by means of a lead 62, and the other terminal of the winding 61 is connected to the lead 25 through a lead 63, a current limiting resistor 64 and a lead 65.

It can be readily appreciated from an inspection of the circuit diagrams of FIGURE 1 and FIGURE 4 that the circuit of FIGURE 4 provides a time delay in the voltage rise across the contact electrodes 21 and 24 of the switching element 22 as these contact electrodes open and provides a delay in the current rise through these electrodes as these electrodes close. In the circuit of FIGURE 4, however, square loop material is employed to construct the saturable capacitor 27 and the saturable inductor 42 that may take the form of a bistable magnetic switch.

Referring now to FIGURE 5, the hysteresis loop of the saturable capacitor 27 constructed of the square loop material is shown. It can be appreciated that this is an idealized hysteresis loop and that the saturable capacitor will have two stable states with a remnant charge represented on the hysteresis loop by the letters G and H. The purpose of the voltage divider 57 is to divide the voltage of the source 10 and to charge the linear capacitor 52 to the voltage of the junction 56 of the voltage divider 57 through the lead 55, the junction 51 and the lead 53. The voltage at the junction 56, and hence the voltage to which the linear capacitor 52 is charged, should be at least equal to and not much greater than the coercive voltage of the saturable capacitor 27, and in the preferred form of the invention these two voltages should be made equal to one another. For example, if the terminal voltage of the source of electrical energy 10 is 12 volts, the capacitor 52 could be charged to approximately 4 or 5 volts and this should equal the coercive voltage of the saturable capacitor 27.

With the contacts 21 and 24 of the switching element 22 closed, the saturable capacitor 27 will be in the position on the hysteresis loop shown in FIGURE 5, at the point designated by the letter I. The terminal of the saturable capacitor 27 connected to lead 28 is connected to the lead 25 and hence to the other terminal 33 of the source of electrical energy 10, through the closed contacts 21 and 24, the movable arm 23, lead 26, load 46, and lead 47.

If it is assumed that there is no voltage drop across the load 46, then with 4 or 5 volts appearing at the junction 51, the foregoing explanation of the position of the saturable capacitor 27 on the hysteresis loop shown in FIGURE 5 would hold true. If there is a voltage drop across the load 46, however, when steady state conditions have been reached, the difference in potential across the saturable capacitor 27 should be made equal to the coercive voltage of the saturable capacitor 27. The voltage, therefore, of the terminal 51 and the voltage on the capacitor 52 should be adjusted upwardly by the voltage divider 57 so that the difference in the potential across the saturable capacitor 27, or the difference between the voltage at the junction 51 and the voltage drop across the load 46, is equal to the coercive voltage of the saturable capacitor 27.

When the contacts 21 and 24 open, the voltage across the saturable capacitor 27 will reverse and will be limited temporarily to twice the coercive voltage of the capacitor. At this time the saturable capacitor will be driven from the point I to the point J on the hysteresis loop of FIGURE 5. After the point J has been reached, the voltage across the saturable capacitor 27 and hence the switching element 22 will be free to rise along the line K. The delay encountered or provided is a function of the current flowing initially through the switching element 22 in amperes and twice the saturation charge of the saturable capacitor and this delay will be given in seconds since the charge in coulombs is in effect amp.-sec. For example, if the saturation charge is 175 microcoulombs, twice the saturation charge will be 350 microcoulombs. With a 3.5 amp. current flowing in the first winding 41 of the saturable inductor 42 and through the switching element 22, the voltage rise above twice the coercive voltage of the saturable capacitor 27 will be delayed by 100 microseconds. This amount of delay should be sufficient to allow the contacts or electrodes 21 and 24 to separate sufficiently to prevent arcing.

A similar situation exists with relation to the saturable inductor 42 that may take the form of a bistable magnetic switch. The hysteresis loop for this saturable inductor or bistable magnetic switch is shown in FIGURE 6. If it is assumed that the contact electrodes 21 and 24 are separated so that the switching element 22 is in its nonconducting state, and that steady state conditions have been reached, there will be no current flow through the first winding 41 of the saturable inductor or bistable magnetic switch 42. The second winding 61 in the form of a biasing winding will provide sufficient flux linkage of a direction or polarity to position the saturable inductor 42 at the point L on the hystersis loop shown in FIGURE 6. When the contacts 21 and 24 commence to close, the current through the switch 22 and the first winding 41 will be limited to twice the coercive current of the saturable inductor until the saturable inductor 42 is switched so that its state is represented by the letter M on FIGURE 6. At this time the current will be free to rise. It should be noted from the polarity of the windings 41 and 61 that current flow through them produce voltage rises of opposite polarity and hence they produce flux of opposite directions in the toroidal core 42. If, for example, the voltage developed across the primary winding 41 is on the order of 3½ volts and a hundred microsecond delay in the rise of the current above twice the coercive current is desired, then a saturable inductor 42, or bistable magnetic switching element, having a saturation flux linkage of 175 volt-seconds should be employed since the delay is determined by twice the saturation flux linkages, i.e. from the point L to the point M on the hysteresis loop shown in FIGURE 6. It will require 100 microseconds to traverse this 350 volt-second change. When the contacts 21 and 24 again open, the current flow through the winding 61 will again return the saturable inductor 42 to the point L on the hysteresis loop of FIGURE 6 after steady state conditions have been reached.

The switching circuit shown in FIGURE 4 will thus provide a means for reducing the electrical energy dissipation in the switching element 22 when the electrical contacts 21 and 24 both open and close.

One very important application for the switching circuit shown in FIGURE 4 is in an ignition system for an internal combustion engine as represented by the circuit diagram of FIGURE 7. In an ignition system the saturable inductor or bistable magnetic switch 42 is not required, since the inductance of the ignition coil limits the initial current through the primary winding of the ignition coil and hence through the contacts of the ignition contact breaker points as the contact breaker points close. The use of the saturable capacitor system as disclosed in FIGURE 4 in an ignition system for an internal combustion engine will prevent arcing of the ignition contact breaker points and greatly increase their useful life.

In the ignition system shown in FIGURE 7, the electrode 11 of the source of electrical energy 10 is connected to an ignition switch 71 through the lead 12, a lead 72 and a resistor 70. The ignition switch 71 is connected to the junction 38 through a lead 73, and the junction 38 is in turn connected to a primary winding 74 of an ignition coil 75 through a lead 76. The other terminal of the primary winding 74 of the ignition coil 75 is connected to the junction 44 through a lead 77.

The ignition coil 75 includes a secondary winding 81 having one terminal connected to ground through a lead 82 and the other terminal connected through a lead 83 to a rotating arm 84 of a distributor 85. The distributor has spaced contacts 86 through 91 that are adapted to be sequentially energized by the rotatable arm 84, and these contacts are connected to spark plugs 92 through 97 by means of leads 98 through 103 respectively.

The rotatable arm 84 is rotatable in synchronism with a switch operating means, preferably in the form of a cam 106, that is adapted to periodically open and close the contacts or electrodes 21 and 24 of the switching element 22. This switching element 22, including the contacts or electrodes 21 and 24, take the form of a conventional set of ignition contact breaker points and the cam 106 is adapted to open the contacts 21 and 24 when the rotatable arm 84 comes into contact with one of the contacts 86 and 91 of the distributor 85.

In operation of this circuit, with the contacts 21 and 24 of the switching element closed, the junction 44 and the terminal of the saturable capacitor 27 connected to lead 28 is grounded through the closed contacts 21 and 24, lead 26 and lead 25. With the voltage at the junction 56 of voltage divider 57 selected to be equal to the coercive voltage of the saturable capacitor 27, for example, 4 or 5 volts, the saturable capacitor will be in the position represented by the letter I in FIGURE 5 since the linear capacitor 52 is charged to this voltage level. When the cam 106 opens the switching element 22 to separate the contacts 21 and 24, a voltage will be induced in the primary winding 74 in an attempt to maintain current flow through the switching element and the primary winding 74 momentarily constant in the face of the increasing resistance in the circuit brought about by the opening of the contacts 21 and 24. This voltage rise may be on the order of some 250 volts in a conventional internal combustion engine ignition system. The purpose of the saturable capacitor 27 is to delay this voltage rise and to limit it to twice the coercive voltage of the saturable capacitor 27 until the contacts 21 and 24 are open sufficiently far so that a larger voltage cannot cause arcing across the contacts 21 and 24. As explained previously in relation to the circuit shown in FIGURE 4, the voltage rise that takes place in the primary winding 74 of the ignition coil 75 will reverse the polarity of the voltage across the saturable capacitor 27 and will drive the capacitor from the point I to the point J on the hysteresis loop shown in FIGURE 5. The delay in the rise of the voltage above twice the coercive voltage of the saturable capacitor is determined by the electrical parameters consisting of the saturation charge of the capacitor 27 and the current in the primary winding 74 of ignition coil 75. For example, if the current in the primary winding 74 is two amperes during normal operating conditions, and if the saturation charge of the saturable capacitor 27 is 200 micro coulombs, then the delay in the rise of the voltage across the primary winding 74 and the switching element 22 would amount to 200 microseconds. This delay should be more than sufficient to allow the contact electrodes 21 and 24 to open sufficiently to prevent arcing. After this delay of 200 microseconds, the voltage across the primary winding 74 is free to rise to normal levels to provide the proper ignition voltages in the secondary winding 81. In this application, a saturable capacitor 27 constructed of a crystalline form of barium titanate, $BaTiO_3$, with a total area of 5 to 7 square centimeters should be sufficient to provide the proper delay.

In FIGURE 8, there is shown a transistorized ignition system for an internal combustion engine in which a transistor 110 is employed to switch the current flowing through the primary winding 74 of the ignition coil 75. The transistor 110 has a collector 111 connected to the junction 44 by means of a lead 112 and an emitter 113 connected to lead 25 through a lead 114. The emitter 113 and the collector 111 comprise the output circuit of the transistor 110 that is connected in series with the primary winding 74 of ignition coil 75. The base 115 of transistor 110 is connected to the electrode 11 of the source of electrical energy 10 through a resistor 116, a switching element 22 in the form of a set of ignition contact breaker points as described in FIGURE 7, a lead 117, the lead 73, ignition switch 71, resistor 70 and lead 72. A biasing resistor 118 is connected between the base 115 and the emitter 113 by means of the lead 25 and the lead 114.

The cam 106 is rotated in synchronism with the rotatable arm 84 of the distributor 85, and with the contacts 21 and 24 closed, the transistor 110 is properly biased and is in its conducting state since the closed electrodes 21 and 24 provide a path for the base current of the transistor 110.

When contacts 21 and 24 are moved to the open position by the cam 106, the transistor 110 is switched to its non-conducting state since the path for the base current is interrupted. The saturable capacitor 27 operates in the same manner as the saturable capacitor shown in FIGURE 7 to delay a voltage rise across the transistor 110 in excess of twice the coercive voltage of the saturable capacitor 27 until the transistor 110 is switched into its fully nonconducting state. Thus when the voltage across the transistor 110 does rise above twice the coercive voltage of the saturable capacitor 27, the transistor 110 is in its fully nonconducting state and hence presents a very high resistance. Since the energy dissipation is determined by the square of the voltage across the transistor divided by four times the resistance of it, the high resistance repressented by the nonconducting transistor prevents substantial energy dissipation in the transistor.

The same orders of magnitude of electrical parameters may be employed with this circuit as employed with the circuit of FIGURE 7 except in a transistorized ignition system the current through the primary winding may be as high as 3.5 amps. In this case a saturable capacitor 27 having 175 micro coulomb saturation charge will furnish a 100 microsecond delay in the voltage rise above twice the coercive voltage of the saturable capacitor 27. After the 100 microsecond delay, the ignition voltages in the primary winding 74 are free to rise to provide proper ignition voltages in the secondary winding 81.

Another embodiment of an ignition system employing the principles of the invention is shown in FIGURE 9. In FIGURE 9 the saturable capacitor 27 is connected directly across the switching element 22 as was the case in the switching circuit shown in FIGURE 1. In this case the saturable capacitor should employ a material that will provide a hysteresis loop as shown in FIGURE 2. For example, a disc ceramic capacitor constructed of Ceramite may be employed. A typical one of these capacitors is a Sprague series 5 HK type P 10.

The operation of this circuit is substantially the same as that shown in FIGURE 7, except that no initial bias is applied to the saturable capacitor 27, and it will operate between the points A and C and along the line B as the contacts or electrodes 21 and 24 are open as explained more fully in relation to the circuit shown in FIGURE 1. In this case, however, in order to provide proper delay in the rise of the voltage across the primary winding 74, the charge represented between the points A and C should be sufficient to provide a delay long enough to permit the contacts 21 and 24 to open sufficiently far so that arcing will not occur. If a current of two amperes is present in the primary winding 74 and through the contacts 21 and 24 prior to the opening of the contacts, then to give a delay of 100 microseconds the capacitor must accept 200 microcoulombs of charge in going from the point A to the point C on the hysteresis loop shown in FIGURE 2. The voltage across the ignition points 21 and 24 should not be permitted to rise substantially above 8 to 10 volts for this 100 microseconds. The knee C of the hysteresis loop should be located, therefore, not more than 8 to 10 volts along the abscissa of the hysteresis loop shown in FIGURE 2.

Another embodiment of the invention as applied to an ignition system for an internal combustion engine is shown in FIGURE 10. In this embodiment of the invention, the saturable capacitor 27 is connected directly across the primary winding 74 of the ignition coil 75 by means of leads 121 and 122. With the contacts 21 and 24 of the switching element 22 closed, it can be appreciated that the voltage drop across the saturable capacitor 27 is the same as the voltage drop across the primary winding 74 of the ignition coil 75.

When the ignition contact breaker points or the contacts 21 and 24 of switching element 22 open, the voltage across the primary winding 74 will attempt to rise as previously explained, with a polarity opposite to the polarity established by the current flow through it when the contact electrodes 21 and 24 are closed. This is true because the magnetic field rather than rising at this point commences to collapse. As stated previously, this voltage may go as high as 250 volts in an ordinary ignition system for an automotive vehicle in which a strorage battery 10 of 12 volts is employed. The saturable capacitor 27 of this circuit may employ the square loop material as represented by the hysteresis loop of FIGURE 5, and the voltage rise across the saturable capacitor 27 will be delayed until the saturable capacitor 27 is switched to the point J on this curve. After this period of time the voltage will be free to rise along the line K to provide proper ignition voltages for the system. The typical values given in describing the circuit of FIGURE 7, may also be applied here to provide a proper amount of delay in the rise of the voltage of the saturable capacitor 27 so that arcing of the contacts 21 and 24 will not occur when the voltage does rise above this level.

When the contacts or electrodes 21 and 24 close, quite a large transient voltage appears across the primary winding 74 of the ignition coil 75 and this large transient voltage also appears across the saturable capacitor 27. Since it is opposite in polarity to the voltage appearing across the primary winding 74 of the ignition coil 75 when the contact electrodes 21 and 24 open, the saturable capacitor is reset and goes into saturation to the right of position I on the hysteresis loop of FIGURE 5. A short period of time after the contact electrodes 21 and 24 close, the inductive reactance that caused the initial voltage transient will decrease to a negligible value, and the voltage drop across the primary winding 75 and the saturable capacitor 27 will be very small. This leaves the saturable capacitor 27 in the positon G on the hysteresis loop of FIGURE 5.

When the contact electrodes 21 and 24 again open, the voltage rise across the saturable capacitor 27 will be limited until saturation is reached to the coercive voltage of the saturable capacitor 27. This voltage, however, is of a polarity to add to the voltage of the battery 10 and the sum of these voltages is applied across the contact electrodes 21 and 24. In contact electrodes, particularly those used in ignition breaker points, the voltage rise across them upon opening should be momentarily limited to 14 volts or less. It can be appreciated, therefore, that the circuit shown in FIGURE 10 should be employed in a low voltage ignition system where the sum of the terminal voltage of the battery 10 plus the coercive voltage of the saturable capacitor 27, does not exceed 14 volts when the contact electrodes 21 and 24 initially open.

Another embodiment of the invention as applied to an ignition system for an internal combustion engine is shown in FIGURE 11. It is employed to limit the voltage across the contacts 21 and 24 of the electrical switching element 22 as the contacts 21 and 24 commence to open to less than twice the coercive voltage of the saturable capacitor 27. In this embodiment of the invention, a second switching element 132 is employed that has switching contacts 133 and 134, with the contact 134 mounted on movable arm 135. The stationary contact or electrode 133 is connected to the lead 73 by means of lead 137, resistor 138 and lead 141, while the movable arm 135 is connected to the lead 25 through a lead 142 and a source of electrical energy 143. If the polarity of the source of electrical energy 10 is as shown with the positive terminal 11 connected to the lead 73 through the lead 12, lead 72, resistor 70 and ignition switch 71, then the source of electrical energy or battery 143 should be of the opposite polarity with the negative terminal connected to the lead 142 and the positive terminal connected to the line 25.

The saturable capacitor 27 has one terminal connected to the primary winding 74 of ignition coil 75 through a lead 146, the junction 44 and the lead 77, while the other terminal is connected to the contact 133 of switching element 132, through a lead 147. This terminal is also connected to the lead 73 by means of the lead 137, resistor 138, and lead 141 as previously described. The cam 151 that is used to open and close the contacts or electrodes 133 and 134 should be operated in synchronism with the cam 106 employed to open and close the contact electrodes 21 and 24 and the rotatable arm 84 of the distributor 85.

Referring now to the hysteresis loop of FIGURE 5, if the negative potential of the battery 143 is applied to the terminal of the capacitor 27 connected to lead 147 through the contact electrodes 133 and 134 just prior to the opening of the switching contacts 21 and 24, this negative voltage will be subtracted from the positive voltage applied to this terminal by means of the source of electrical energy 10 through the resistor 70, the ignition switch 71, the lead 73, lead 141, resistor 138 and lead 137. If the voltage drop across the resistor 73 is, for example, 6 or 7 volts, then the voltage at the lead 141 will be approximately 4 or 5 volts if the source of electrical energy 10 is a standard 12 volts.

The source of electrical energy 143 may be selected so that it will position the saturable capacitor 27 at the point O on the hysteresis loop shown in FIGURE 5. Without this source of electrical energy, of course, the saturable capacitor would be positioned at the point I as previously described in relation to the circuits of FIGURES 4 and 7. This implies that the contacts 133 and 134 must close just prior to the opening of the contacts 21 and 24. If, for example, the coercive voltage of the saturable capacitor 27 is 5 volts and this is the potential present in a positive direction on the line 73, then a 9 volt battery or source of electrical energy 143 would position the saturable capacitor at the point O within 1 volt of the negative coercive threshold as shown by the hysteresis loop of FIGURE 5. When the contacts 21 and 24 open, therefore, the voltage rise across them will be limited to this 1 volt for the delay time that it takes the capacitor to go from the point O to the point J on the hysteresis loop of FIGURE 5. This may be in the order of 100 to 200 microseconds as discussed above and should provide sufficient time to allow the contacts 21 and 24 to open sufficiently so that as the voltage rises along the line K that no arcing will occur.

When the contacts 21 and 24 close, the contacts 133 and 134 open. The capacitor will then be reset back to the point I on the hysteresis loop of FIGURE 5 by the voltage applied to the terminal connected to lead 147 via lead 73, lead 141, resistor 138 and lead 137. Thereafter, and before the contacts 21 and 24 open again, the contacts 133 and 134 should close to apply the negative voltage of the battery 143 to the saturable capacitor 27 and move it from the point I to the point O on the hysteresis loop of FIGURE 5.

Thus the present invention provides a means for preventing or reducing the energy dissipation in an electrical switching element both upon the switching of the element from its conducting to its nonconducting state and from its nonconducting to its conducting state. It is particularly applicable to an ignition system for an internal combustion engine in which a delay in the rise of ignition voltages is provided sufficient to allow the switching element in the system, either electrical contacts or a transistor, to be switched far enough to its nonconducting state so that these ignition voltages when they are generated do not lead to arcing in the electrical contacts or to high energy dissipation in the transistor.

It is to be understood that this invention is not to be limited to the exact construction shown and described but that various changes and modifications may be made without departing from the spirit and scope of the invention as defined in the appended claims.

I claim:

1. In an electrical switching system, a source of electrical energy, a load including an inductive component, an electrical switching means connected in circuit with said source of electrical energy and said load for controlling the energization of said load from said source of electrical energy, a saturable capacitor connected across said switching means for delaying the voltage rise across said switching means as said switching means is switched to its nonconducting state, and a saturable inductor connected in series with said switching means and saturable at a fraction of a final current through said electrical switching means and said load when said electrical switching means is in a conducting state to thereby delay current increase through said switching means as said switching means is switched to its conducting state.

2. In an electrical switching system, a source of electrical energy, a load including an inductive component, an electrical switching means connected in circuit with said source of electrical energy and said load for controlling the energization of said load from said source of electrical energy, a saturable capacitor connected across said electrical switching means, circuit means connected to said source of electrical energy and said capacitor for applying a unidirectional bias voltage at all times across said saturable capacitor of a polarity opposite to the voltage rise across said switching means as said switching means is switched to its nonconducting state.

3. The combination of claim 2 in which said circuit means comprises an electrical energy storage element having a terminal connected to said saturable capacitor and a voltage divider connected across said source of electrical energy with an intermediate point on said voltage divider connected to said terminal of said electrical energy storage element.

4. In an electrical switching system, a source of electrical energy, a load, an electrical switching means connected in circuit with said source of electrical energy and said load for controlling the energization of said load from said source of electrical energy, a saturable inductor connected in series with said electrical switching means and saturable at a fraction of the final current through said electrical switching means and said load when said electrical switching means is in a conducting state, and circuit means coupled to said source of electrical energy and said saturable inductor for developing a unidirectional magnetic flux at all times in said saturable inductor of a polarity opposite to the magnetic flux developed in said saturable inductor as a result of the current increase through said switching means as said switching means is switched to its conducting state.

5. In an electrical switching system, a source of electrical energy, a load including an inductive component, an electrical switching means connected in circuit with said source of electrical energy and said load for controlling the energization of said load from said source of electrical energy, a saturable capacitor connected across said electrical switching means, circuit means connected to said source of electrical energy and said capacitor for applying a unidirectional bias voltage at all times across said saturable capacitor of a polarity opposite to the voltage rise across said switching means as said switching means is opened, a saturable inductor connected in series with said electrical switching means and saturable at a fraction of the final current through said electrical switching means and said head when said electrical switching means is closed, and circuit means coupled to said source of electrical energy and said saturable inductor for developing a unidirectional magnetic flux at all times in said saturable inductor of a polarity opposite to the magnetic flux developed in said saturable inductor as a result of the current increase through said switching means as said switching means is closed.

6. The combination of claim 5 in which said first circuit means comprises a linear capacitor having one terminal connected to said saturable capacitor, and a voltage divider connected across said source of electrical energy with an intermediate point on said voltage divider being connected to the terminal of said linear capacitor that is connected to said saturable capacitor.

7. The combination of claim 5 in which said saturable inductor includes a saturable core and a first winding connected in series with said source of electrical energy and said second circuit means includes a second winding connected to said source of electrical energy and coupled to said saturable core and being wound to produce a magnetic flux in said saturable core of a polarity opposite to the magnetic flux developed in said saturable core as a result of current increase through said first winding as said switching means is closed.

8. An ignition system for an internal combustion engine comprising a source of electrical energy, an ignition coil including a primary and a secondary winding, a switching element connected in series with said source of electrical energy and said primary winding, a spark plug, means for connecting said spark plug with said secondary winding, means operable by the internal combustion engine for alternately switching said switching element between conducting and nonconducting states, means connected across said switching element for delaying the voltage rise across said switching element when said switching element is switched to its nonconducting state for a period sufficient to prevent the dissipation of large amounts of electrical energy in said switching element, said means including a saturable capacitor having two stable states and separate circuit means for biasing and saturable capacitor into one stable state when said switching element is in a conducting state of a polarity opposite to the polarity of the state to which said saturable capacitor is switched when said switching element is switched to its nonconducting state.

9. The ignition system of claim 8 in which said last mentioned means includes a linear capacitor connected in series with said saturable capacitor and a voltage divider connected across said source of electrical energy and to said saturable capacitor, with a fraction of the voltage of said source of electrical energy as determined by said voltage divider applied to said linear capacitor.

10. The ignition system of claim 8 in which said switching element is a set of electrical contacts.

11. The ignition system of claim 8 in which said switching element is a transistor having an emitter and collector connected in series with said source of electrical energy and said primary winding of said ignition coil and a base coupled to said means operable by the internal combustion engine.

12. In an ignition system for an internal combustion engine comprising a source of electrical energy, an ignition coil including a primary and a secondary winding, a first set of electrical contacts connected in series with said source of electrical energy and said primary winding of said ignition coil, a spark plug, means for connecting said spark plug with said secondary winding, means operable by said internal combustion engine for alternately opening and closing said first set of electrical contacts, a second set of electrical contacts, means operable by said internal combustion engine for alternately opening and closing said second set of contacts, a saturable capacitor connected across said primary winding of said ignition coil and having one terminal connected to said first set of contacts and the other terminal connected to said second set of contacts, a second source of electrical energy coupled to said second set of electrical contacts and applying a voltage when said second set of contacts is closed to said other terminal of said saturable capacitor of a polarity opposite the polarity of the voltage applied by the voltage drop across said saturable capacitor by said primary winding when said first set of contacts is closed, said saturable capacitor having a substantially square hysteresis loop, said second set of contacts closing just prior to the opening of said first set of contacts and said second source of electrical energy having a magnitude to bias said saturable capacitor just below the coercive threshold voltage prior to the opening of said first set of contacts.

References Cited by the Examiner

UNITED STATES PATENTS

| | | | |
|---|---|---|---|
| 2,572,598 | 10/1951 | Curtis | 317—11 |
| 2,717,343 | 9/1955 | Anderson | 317—258 |
| 2,953,720 | 9/1960 | Engel | 315—209 |
| 3,211,915 | 10/1965 | Poehlman | 307—88 |

JOHN W. HUCKERT, *Primary Examiner.*

D. O. KRAFT, *Assistant Examiner.*